(12) United States Patent
Barnes (10) Patent No.: US 8,235,265 B2
(45) Date of Patent: *Aug. 7, 2012

(54) ACCESSORY MOUNT FOR VEHICLE CONTROL BODIES

(76) Inventor: Ted A. Barnes, Garland, TX (US)

( * ) Notice: Subject to any disclaimer, the term of this patent is extended or adjusted under 35 U.S.C. 154(b) by 1455 days.

This patent is subject to a terminal disclaimer.

(21) Appl. No.: 10/727,697

(22) Filed: Dec. 4, 2003

(65) Prior Publication Data

US 2004/0108348 A1   Jun. 10, 2004

Related U.S. Application Data

(60) Provisional application No. 60/431,430, filed on Dec. 9, 2002.

(51) Int. Cl.
*B62J 7/00* (2006.01)
*B62J 9/00* (2006.01)
*B62J 7/06* (2006.01)
*B62J 11/00* (2006.01)

(52) U.S. Cl. ........ 224/413; 224/419; 224/420; 224/448; 224/456; 224/461

(58) Field of Classification Search .......... 224/413, 224/419, 420, 448, 456, 461, 440, 441, 430; 248/160

See application file for complete search history.

(56) References Cited

U.S. PATENT DOCUMENTS

| 3,568,963 | A | * | 3/1971 | Koskinen | 248/516 |
| 3,825,407 | A | * | 7/1974 | Fujite et al. | 432/227 |
| 4,607,772 | A | * | 8/1986 | Hancock | 224/442 |
| 5,827,282 | A | * | 10/1998 | Pennig | 606/54 |
| 5,845,885 | A | | 12/1998 | Carnevali | |
| 5,928,232 | A | * | 7/1999 | Howland et al. | 606/61 |
| 6,062,053 | A | * | 5/2000 | Ho | 70/233 |
| 6,234,510 | B1 | * | 5/2001 | Hammons | 280/477 |
| 6,305,241 | B1 | * | 10/2001 | Masui et al. | 74/551.8 |
| 6,347,042 | B1 | * | 2/2002 | White | 361/784 |
| 6,588,637 | B2 | * | 7/2003 | Gates et al. | 224/546 |
| 6,644,614 | B1 | * | 11/2003 | Chen | 248/316.1 |
| 6,957,755 | B2 | * | 10/2005 | Mahoney et al. | 224/413 |

FOREIGN PATENT DOCUMENTS

JP    4133886    * 5/1992

OTHER PUBLICATIONS

Translation of JP 4-133886 "Motorcycle Fairing Mount Structure".*
Printout of web pages from RAM Mounts catalog for product "RAM radar detector mounts for vehicles and motorcycles" illustrating U-bolt bases and mounts for clutch/brake reservoirs; 5 pgs (Jan. 2007).

* cited by examiner

*Primary Examiner* — Nathan J Newhouse
*Assistant Examiner* — Lester L Vanterpool
(74) *Attorney, Agent, or Firm* — John G. Fischer, Esq.

(57) ABSTRACT

The present invention discloses a unique and novel vehicle accessory mounting device which attaches to either a left hand or right hand control body of a vehicle handlebar, and permits various orientations for attachment of multiple accessories.

19 Claims, 8 Drawing Sheets

ACCESSORY MOUNT FOR VEHICLE CONTROL BODIES

RELATED ART

This application claims priority to U.S. Provisional Patent No. 60/431,430 filed on Dec. 9, 2002.

FIELD OF INVENTION

The present invention relates to vehicle accessories mounting systems, and in particular, to a device capable of attachment to the throttle or clutch control body of a 4-wheeler, 3-wheeler, motorcycle, snowmobile, jet ski, or similar vehicle that permits easy and secure attachment of numerous accessories.

BACKGROUND OF THE INVENTION

For the past several years, there has been a continuously growing market for accessories for handlebar steered vehicles. In particular, the explosion in electronic technology based on the advancements in integrated circuit technology has made possible the availability of a wide variety of accessories for motorcycles. For example, the aftermarket for motorcycle accessories now includes devices such as CD players, cell phones, portable televisions, GPS locators, radar detectors, and other such devices.

The largest market for these types of devices is for touring style motorcycles. In addition to the vast increase in availability of such devices, the tradition of customization inherent to the motorcycle industry has created a complementary demand for a means of securing these devices to the motorcycle in a safe, secure, and usable manner. Beyond the utilitarian requirements of the mounting devices, there is a need to provide attachments that are consistent with the high standards of aesthetic appeal upon which the customized motorcycle industry was founded.

The prior art method of attachment of aftermarket accessories to vehicles such as motorcycles involves attaching a U-bracket to an exposed portion of the handlebars. The U-bracket will have an arm portion for direct attachment to the accessory, or to a special sleeve designed to hold the accessory.

In another prior art method, the U-bracket would have a threaded receptacle for attachment of a ball stud. The ball stud is a ball having a threaded stud protruding from it. The threaded stud is threaded into a female receptacle on the U-bracket. The ball stud provides a structure for attachment of a ball stud clamping device, which is pivotally adjustable, allowing the accessory to be mounted adjustably. U.S. Pat. No. 5,845,885 issued to Carnevali discloses one such clamping device for movable attachment to a ball stud.

The principle disadvantage of the prior art devices is that they require free handlebar space for attachment. On many modern motorcycle handlebars, there is insufficient space available for such devices. Another disadvantage of these devices is that they require a cylindrical handlebar for attachment. On many motorcycles, the handlebars are constructed of non-cylindrical designs, making attachment of these devices impossible. Another disadvantage of these devices is that the diameter of the cylindrical styled handlebars varies between manufacturers, and thus a specifically sized U-bracket is required for each motorcycle.

Another disadvantage of the prior art devices is that they permit attachment of a single accessory, limiting the number of accessories that can be added. Another disadvantage of these devices is that they provide a singular location for attachment of the ball stud. This limitation often requires relying on the addition of a separate positioning device to effectively locate the accessory in relation to the ball stud.

Another disadvantage of these devices is that they are cumbersome. Adding equipment in the limited free space of the handlebars can cause interference with other equipment surfaces and with the rider. Another disadvantage of these devices is that they are aesthetically displeasing. Owners of high-end touring bikes who want to customize their vehicles place a high value on the aesthetic appeal of any customization.

It can thus be seen that there is a need to develop a device capable of supporting accessories on a 4-wheeler, 3-wheeler, motorcycle, snowmobile, jet ski, or similar vehicle, that does not require additional space of the handlebars; that can be mounted on vehicles with non-cylindrical handlebars; that can be mounted on the vehicle without interfering with other equipment or with the rider; that has multiple positioning and/or multiple attachment interfaces; and that is aesthetically complimentary to the vehicle.

SUMMARY OF THE INVENTION

A primary advantage of the present invention is that it provides an accessory mounting device capable of being mounted on a 4-wheeler, 3-wheeler, motorcycle, snowmobile, jet ski, or similar vehicle without requiring the use of space on the handlebar. Another advantage of the present invention is that it provides an accessory mounting device that can be mounted to vehicles having non-cylindrical handlebars.

Another advantage of the present invention is that it provides an accessory mounting device that is less cumbersome than a handlebar mounted device. Another advantage of the present invention is that it provides support for more than one accessory. Another advantage of the present invention is that it provides optional location mounting of the accessory. Another advantage of the present invention is that it provides an accessory mounting device that is attractive and complimentary to the vehicle.

Another advantage of the present invention is that it provides an accessory mounting device that can be mounted to the control bracket on either side of the handle bars. Another advantage of the present invention is that it provides an accessory mounting device that can be mounted in an inverted position.

Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

In accordance with one aspect of the invention, there is disclosed a unique vehicle accessory mounting device that can be easily attached to either the left or right control body of a vehicle handlebar.

In a preferred embodiment, an accessory mount is disclosed having a body portion. The body portion has a pair of parallel mounting holes, and a radial relief located between the mounting holes. A threaded accessory hole is located on the body. In a more preferred embodiment, each mounting hole has a cylinder portion and a countersink portion that is larger in diameter than the cylinder portion. In a more preferred embodiment, the body is generally rectangular.

In another preferred embodiment, the threaded accessory hole is located between the mounting holes. In an alternative embodiment, the threaded accessory hole is located in substantially perpendicular relationship to the mounting holes. In another preferred embodiment, a ball stud is attached to a threaded accessory hole.

In another preferred embodiment, an accessory mount is disclosed having a body portion. The body portion has a pair of parallel mounting holes and a ball stud attached to the body.

In a preferred embodiment, an accessory mount is disclosed having a body portion. The body portion has a pair of parallel mounting holes, a pair of hollow standoffs, and a threaded accessory hole. In a more preferred embodiment, the body is generally rectangular. In a more preferred embodiment, the body has a radial relief located between the mounting holes. In a more preferred embodiment, each mounting hole has a cylinder portion and a countersink portion that is larger in diameter than the cylinder portion.

In another preferred embodiment, the threaded accessory hole is located between the mounting holes. In an alternative embodiment, the threaded accessory hole is located in substantially perpendicular relationship to the mounting holes. In another preferred embodiment, a ball stud is attached to a threaded accessory hole. In a still more preferred embodiment, the inside diameter of each hollow standoff is substantially the same as the inside diameter of the cylinder portion of the mounting holes.

In still another preferred embodiment, an accessory mount is disclosed having a body portion. The body has a pair of parallel mounting holes, a pair of hollow standoffs, and a ball stud attached to the body.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The terms "right" and "left" as used herein are referenced from the perspective of a person operating a vehicle. The references are intended to aide in the description of the application of the various embodiments of the present invention, and are not intended to be limiting.

Figure 1:
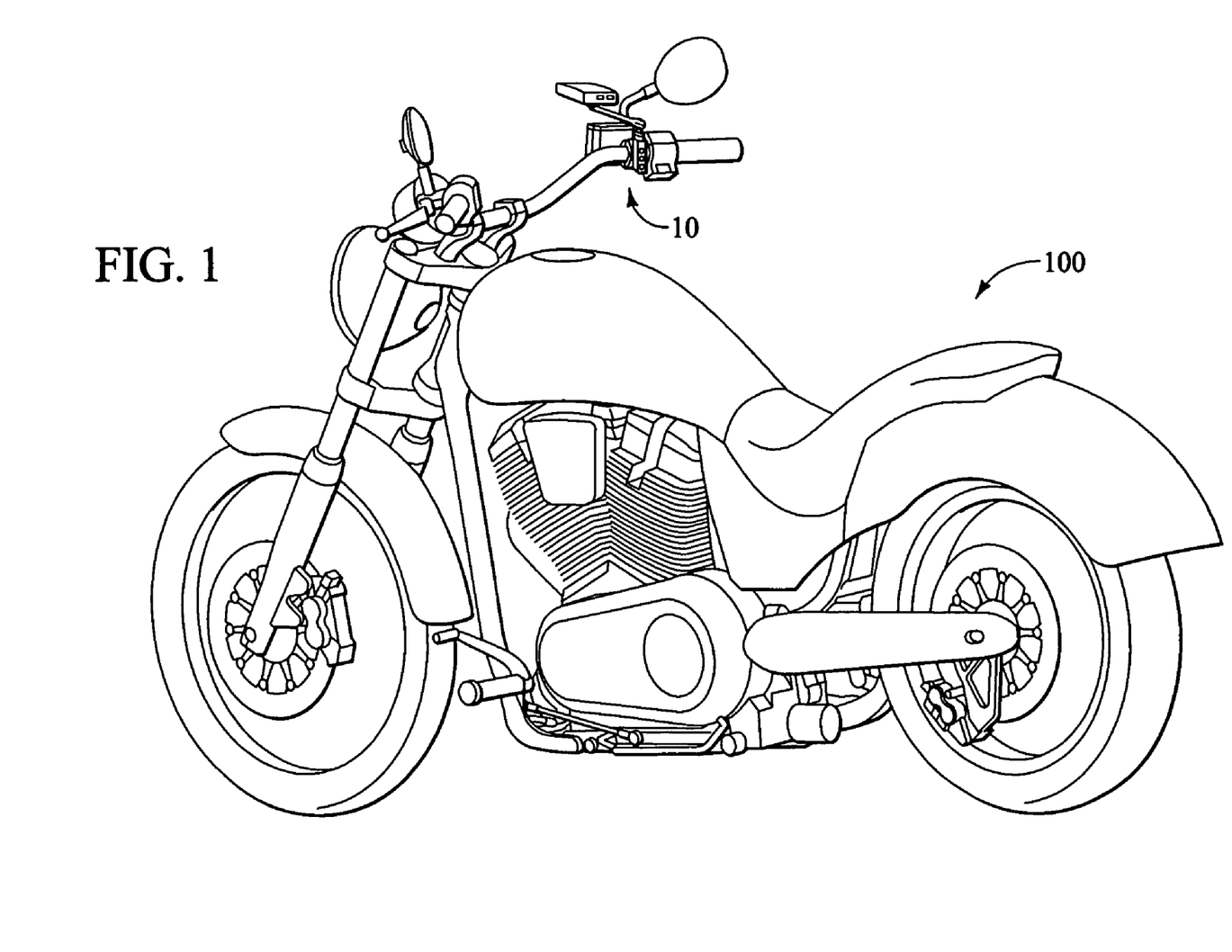
FIG. 1 is a front isometric view of a preferred embodiment of the present invention, disclosing a typical vehicle having an accessory mount attached to the right side control body, and having an accessory, such as a radar detector, attached to the accessory mount.

FIG. 1 is a front isometric view of a preferred embodiment of the present invention, disclosing an accessory mount 10 attached to a typical vehicle 100.

Figure 2:
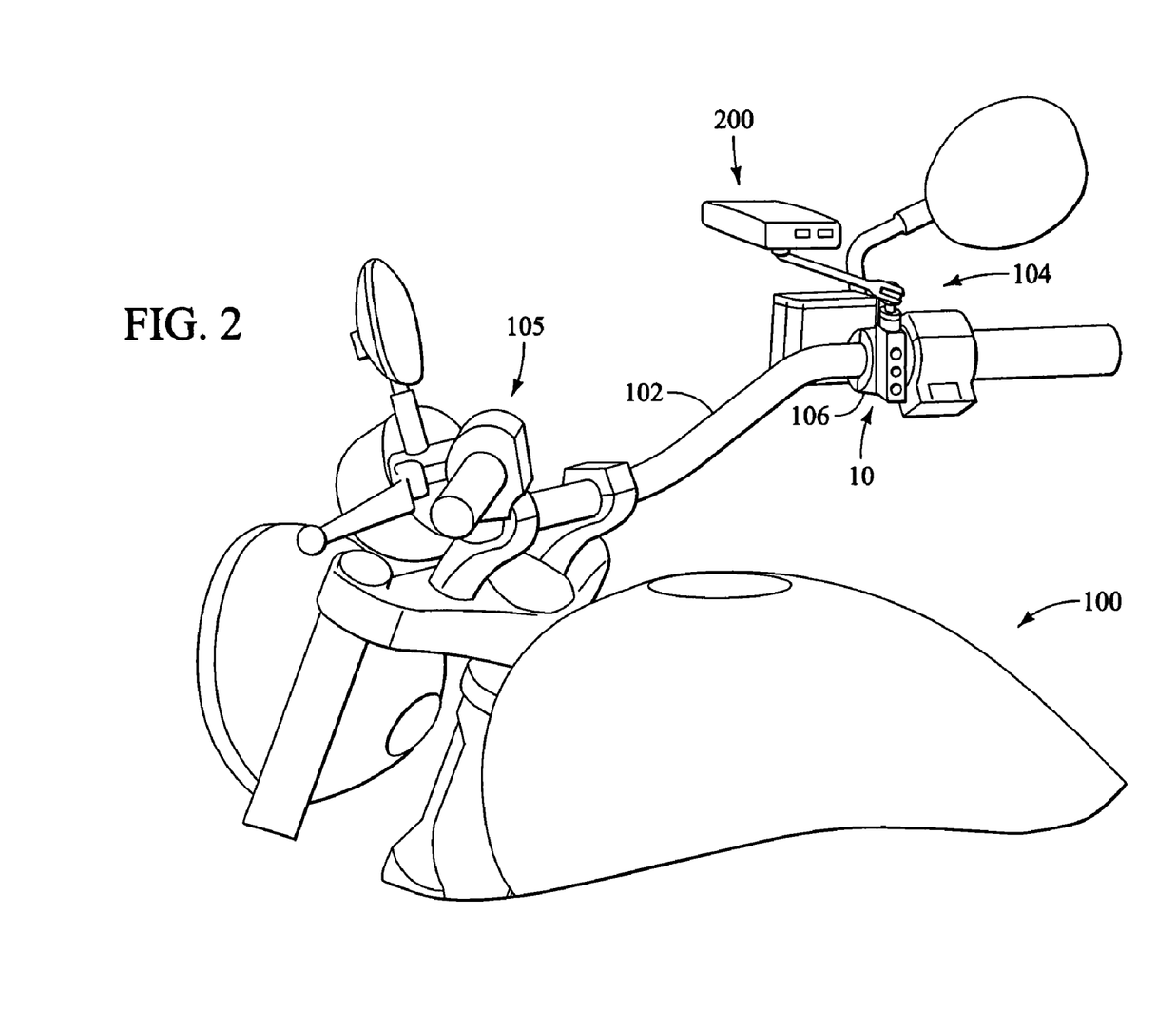
FIG. 2 is a close-up isometric view of the preferred embodiment of the present invention disclosed in FIG. 1.

FIG. 2 is a close-up isometric view of the preferred embodiment of the present invention disclosed in FIG. 1. In this view, vehicle 100 has a handlebar 102. A right side control body 104 is secured to handlebar 102 by a control bracket 106. Typically, right side control body 104 is a throttle and brake control body.

A left side control body 105 is also secured to handlebar 102 by a control bracket 106. Typically, left side control body 105 is a clutch control body. Also typically, a substantially similar or identical control bracket 106 is used for both right side control body 104 and left side control body 105.

In FIG. 2, an accessory mount 10 is shown attached to right side control bracket 106. An accessory 200 is shown attached to accessory mount 10. In this view, accessory 200 is shown to be a radar detector. The accessory type to which the present invention applies is not limited to those shown in the several figures. The illustrated accessory types are intended only to show, by example, the functionality and benefit of the present invention.

Figure 3:
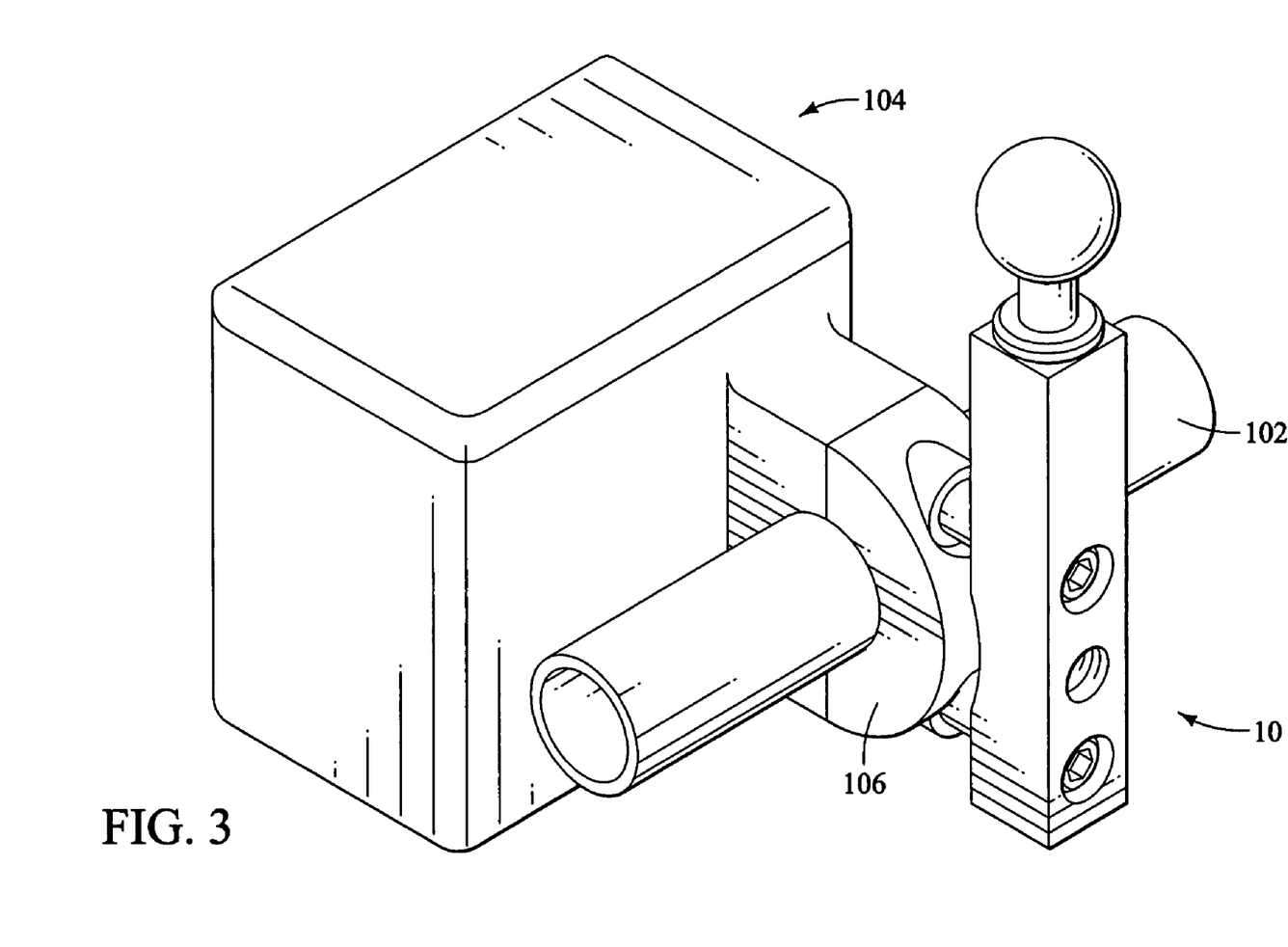
FIG. 3 is an isometric view of the preferred embodiment of the present invention in which an accessory mount is shown attached to a control body of a vehicle.

FIG. 3 is an isometric view of a preferred embodiment of the present invention. In this view, handlebar 102 of vehicle 100 is shown segmented. Control body 104 is secured to handlebar 102 by control bracket 106. Accessory mount 10 is attached to control bracket 106 of control body 104.

Figure 4:
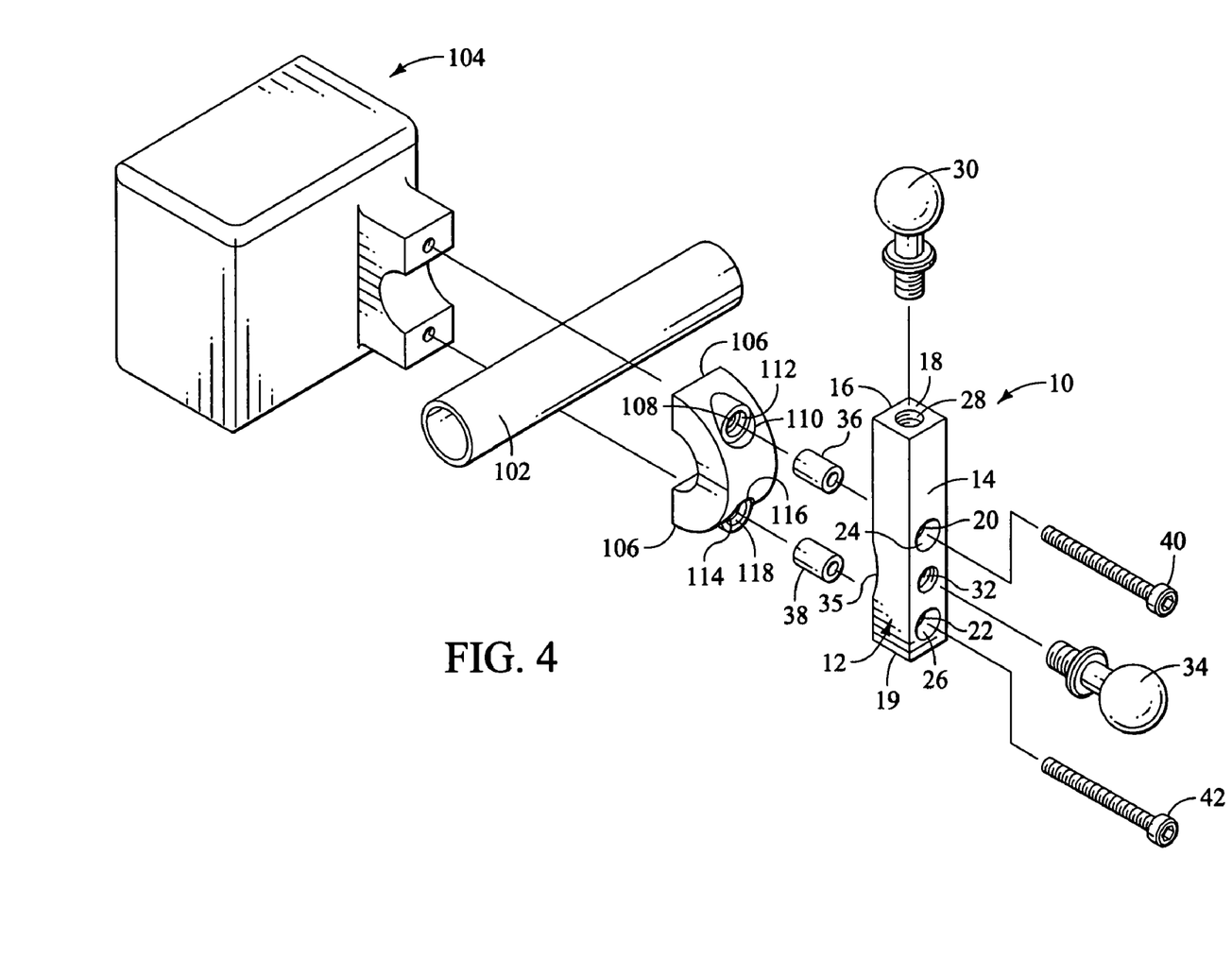
FIG. 4 is an isometric exploded view of a preferred embodiment of the present invention, disclosing the accessory mount including threaded ball studs for attachment of accessories.

FIG. 4 is an isometric exploded view of the preferred embodiment disclosed in FIG. 3. In this view, it is seen that control bracket 106 may be generally semi-cylindrical. While this general geometric description is common of control brackets, it is not the exclusive form control bracket 106 may have, and not a form to which application of the present invention is limited.

Control bracket 106 will typically have a first portal 108 for allowing a first threaded bolt 109 (not shown) to pass through for threaded connection to control body 104 or 105. A recess 110 may be provided to transition first portal 108 with control bracket 106, and provide clearance for the head portion of bolt 109. First portal 108 may also include a countersunk diameter 112. Countersink 112, if provided, is receivable of the head of bolt 109, which is typically an Allen type bolt.

As seen in FIG. 4, a second portal 114 is located on the opposite side of control bracket 106. Second portal 114 allows a second threaded bolt 115 (not shown) to pass through control bracket 106 for threaded connection to control body 104 or 105. A recess 116 may be provided to transition second portal 114 with control bracket 106, and provide clearance for the head portion of bolt 115. Second portal 114 may also include a countersunk diameter 118. Countersink 118, if provided, is receivable of the head of bolt 115, which is typically an Allen type bolt.

Bolts 109 and 115 are located in portals 108 and 114, respectively, and thread connected to control body 104. Torque applied to bolts 109 and 115 compresses control bracket 106 and control body 104 (or 105) against handlebar 102 to secure control body 104 to handlebar 102.

The foregoing description is of a typical handlebar and control body relationship, however, it is recognized that other configurations exist to which the principles of the present invention also apply.

In a preferred embodiment of the present invention disclosed in FIG. 4, accessory mount 10 has a body 12. In a preferred embodiment, body 12 is generally rectangular. Body 12 has a front side 14, a back side 16, a top side 18 and a bottom side 19. In a preferred embodiment, body 12 is approximately 3 inches tall, 0.63 inches wide, and 0.68 inches deep. Body 12 has a pair of mounting holes 20 and 22. In a more preferred embodiment, mounting holes 20 and 22 each have a concentrically located countersunk portion 24 and 26, respectively, located on front side 14 of body 12.

A first threaded accessory hole 28 is located on body 12 for threaded coupling with a first ball stud 30 or other accessory connecting device. In a more preferred embodiment, first accessory hole 28 is located on top side 18 of body 12, substantially perpendicular to the orientation of mounting holes 20 and 22. A second threaded accessory hole 32 is located substantially parallel to the orientation of mounting holes 20 and 22. Second accessory hole 32 permits threaded coupling with a second ball stud 34 or other accessory connecting device. In the most preferred embodiment, second accessory hole 32 is substantially centered between mounting holes 20 and 22.

In an alternative, though less preferred embodiment, ball stud 30 and/or ball stud 34 may be permanently attached to body 12, without the use of threaded holes 28 and/or 32.

In another preferred embodiment, body 12 has a radial relief 35 located on back side 16 of body 12. In a more preferred embodiment, radial relief 35 is centered between mounting holes 20 and 22.

A first standoff 36 extends outward from bolt hole 20 at back side 16 of body 12. A second standoff 38 extends outward from bolt hole 22 at back side 16 of body 12. Standoffs 36 and 38 extend perpendicularly rearward from back side 16 of body 12. In a preferred embodiment, standoffs 36 and 38 are hollow cylinders having an inside diameter substantially equal to the diameter of mounting holes 20 and 22. In a more preferred embodiment, standoffs 36 and 38 are detachable from body 12, as shown in FIG. 4.

A first bolt 40 is disclosed for placement in front side 14 of body 12, and extending through bolt hole 20, through standoff 36, and through portal 108, for threaded engagement with control body 104. A second bolt 42 is disclosed for placement in front side 14 of body 12, and extending through bolt hole 22, through standoff 38, and through portal 114, for threaded engagement with control body 104.

Figure 5:
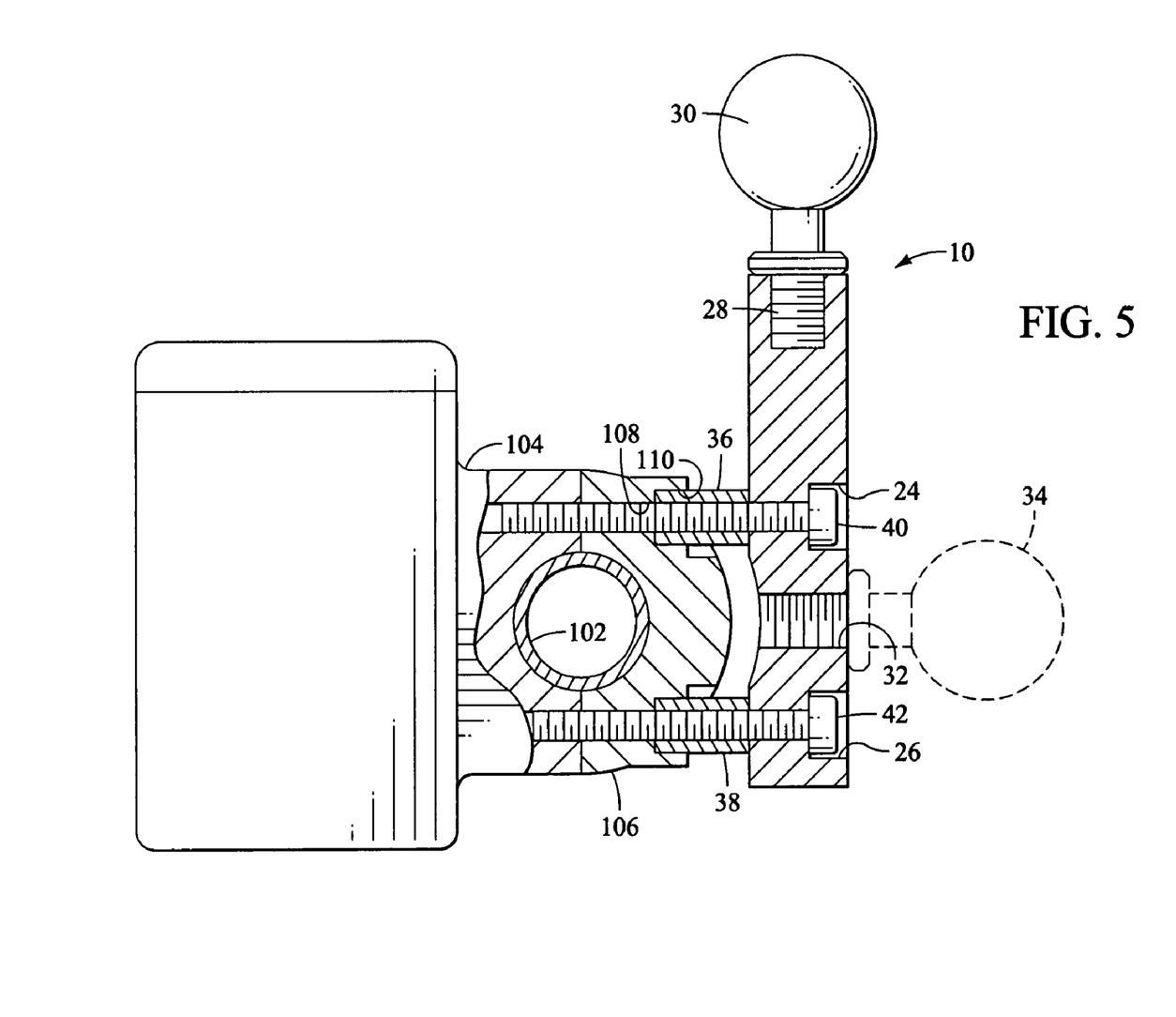
FIG. 5 is a side cross-sectional view of a preferred embodiment of the present invention, disclosing an accessory mount attached to a control body, and having a ball stud attached.

FIG. 5 is a side cross-sectional view of a preferred embodiment of accessory mount 10, disclosing accessory mount 10 attached to control body 104, and having ball stud 30 attached. In this view, the features of the invention that permit easy and secure attachment are best viewed. In the embodiment shown, standoffs 36 and 38 fit into recesses 110 and 116, and abut control bracket 106.

First bolt 40 extends through body 12, through standoff 36, through control bracket 106, and is thread connected to control body 104 (or 105). Second bolt 42 extends through body 12, through standoff 38, through control bracket 106, and is thread connected to control body 104 (or 105).

Figure 6:
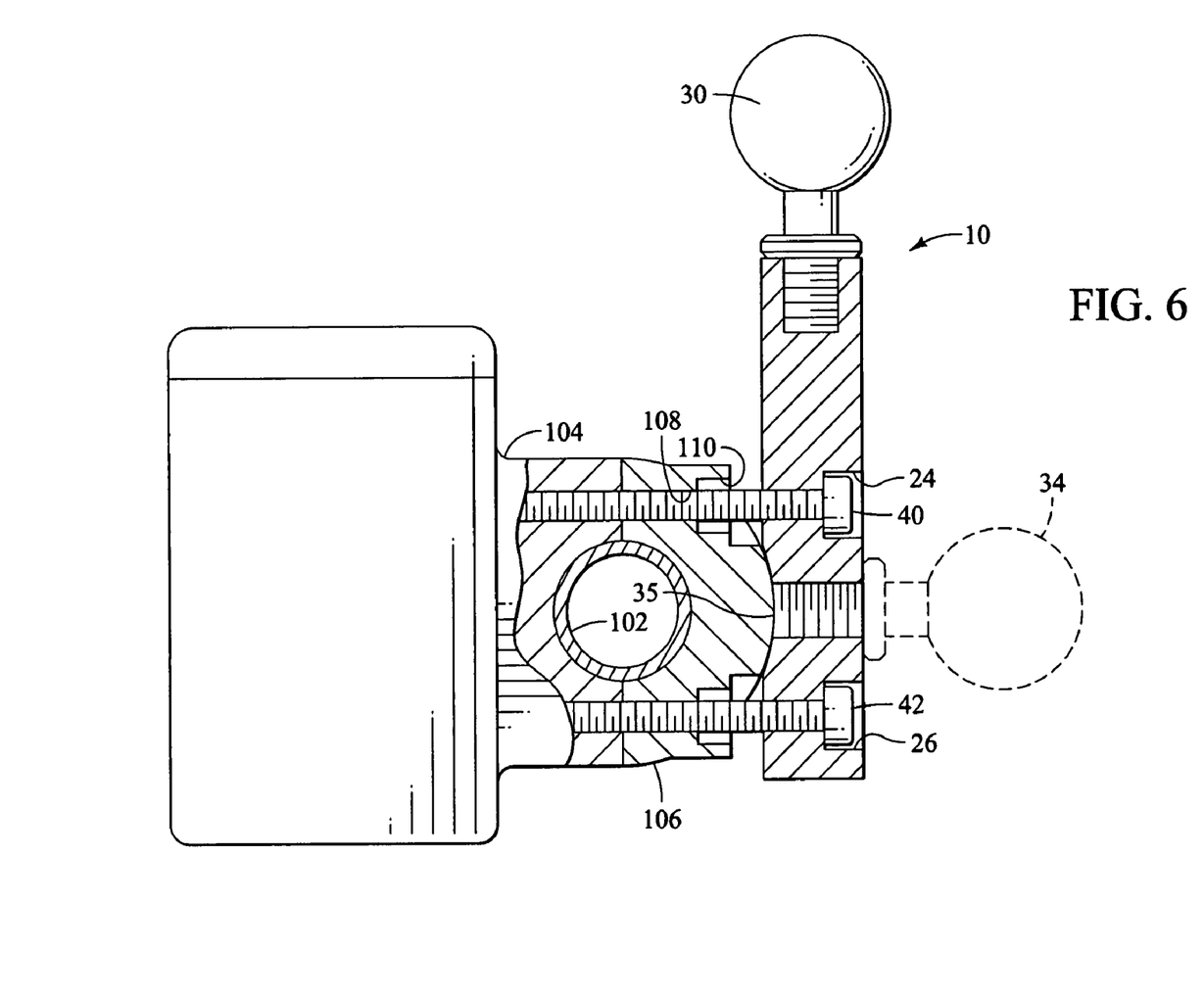
FIG. 6 is a side cross-sectional view of a preferred embodiment of the present invention, disclosing an accessory mount attached directly to a control body, without the use of standoffs.

FIG. 6 is a side cross-sectional view of another preferred embodiment of accessory mount 10, disclosing accessory mount 10 attached to control body 104, and having ball stud 30 attached. In the embodiment disclosed in this view, standoffs 36 and 38 are not used. Instead, radial relief 35 engages control bracket 106 directly. In this embodiment, first bolt 40 extends through body 12, through control bracket 106, and is thread connected to control body 104 (or 105). Second bolt 42 extends through body 12, through control bracket 106, and is thread connected to control body 104 (or 105).

Operation of the Preferred Embodiments

FIG. 1 is a front isometric view of a preferred embodiment of the present invention, disclosing accessory mount 10 attached to a typical vehicle 100. In this view, it can be seen that accessory mount 10 is attached directly to control bracket 106 of control body 104. By virtue of this unique attachment, accessory mount 10 can be mounted on a 4-wheeler, 3-wheeler, motorcycle, snowmobile, jet ski, or similar vehicle without requiring or utilizing any free space on handlebar 102. In addition, this connectivity eliminates the need for a cylindrical handlebar 102 for attachment.

It can also be seen in FIG. 1 that attachment of accessory mount 10 does not interfere with the operation of the vehicle 100, and is less cumbersome than a handlebar mounted device that might come into contact with the operator of vehicle 100 when turning handlebar 102 during navigation of vehicle 100. Referring to FIG. 4, it can be seen that accessory mount 10 can be attached to a vehicle 100 quickly, and with a minimum requirement for tools.

In a first assembly step of a preferred embodiment, the operator removes bolts 109 and 115 (not shown), from the control body (104 or 105) to which the operator will attach an accessory. Bolts 109 and 115 are located in portals 108 and 114 and thread connected to control body 104 or 105.

In a second assembly step of the preferred embodiment illustrated in FIG. 4, bolts 40 and 42 are inserted into mounting holes 20 and 22 from front side 14 of body 12. Bolts 40 and 42 replace bolts 109 and 115 when bolts 109 and 115 are too short to attach accessory mount 10. Bolts 40 and 42 have the same thread design as bolts 109 and 115.

In a third assembly step of the preferred embodiment illustrated in FIG. 4, standoffs 34 and 38 are located on bolts 40 and 42, against back side 16 of body 12.

Figure 8:
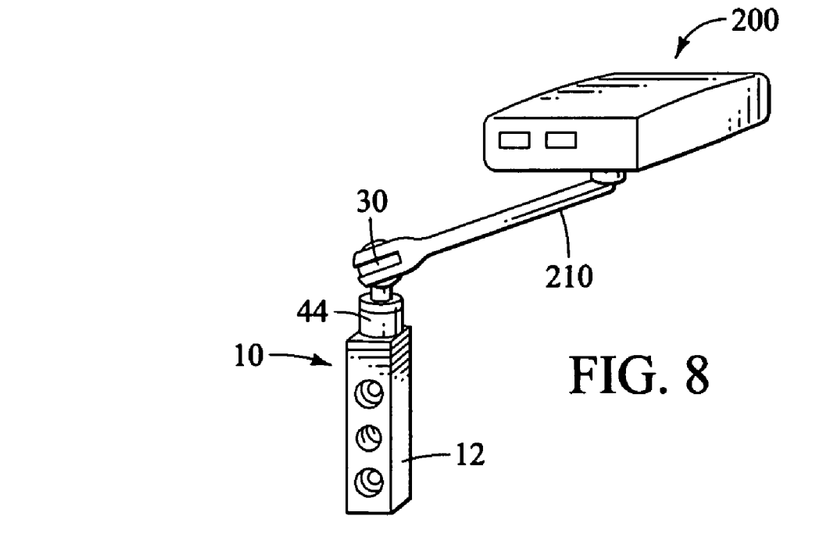
FIG. 8 is an isometric view of a radar detector type accessory attached to a preferred embodiment of the present invention accessory mount.
Figure 9:
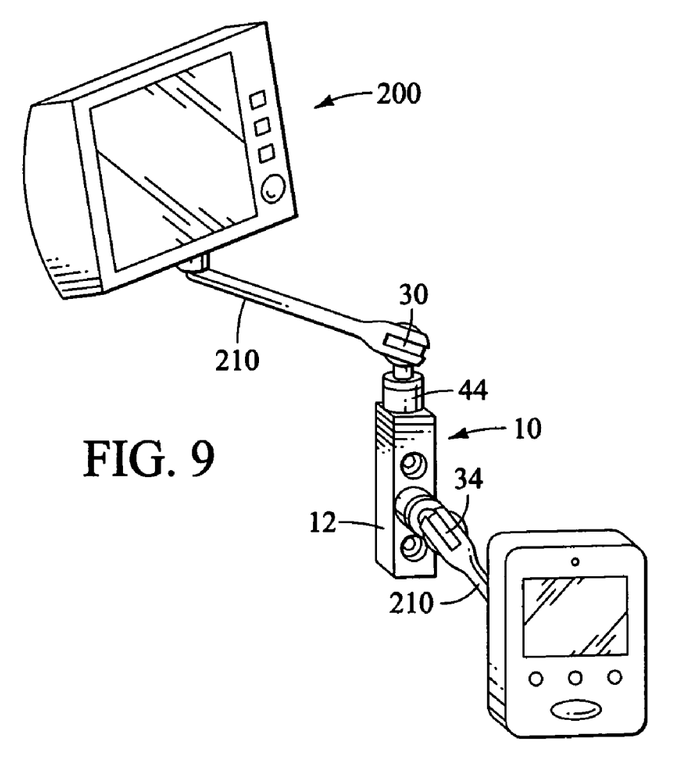
FIG. 9 is an isometric view of a global positioning system (GPS) type accessory and a music player type accessory attached to a preferred embodiment of the present invention accessory mount.
Figure 10:
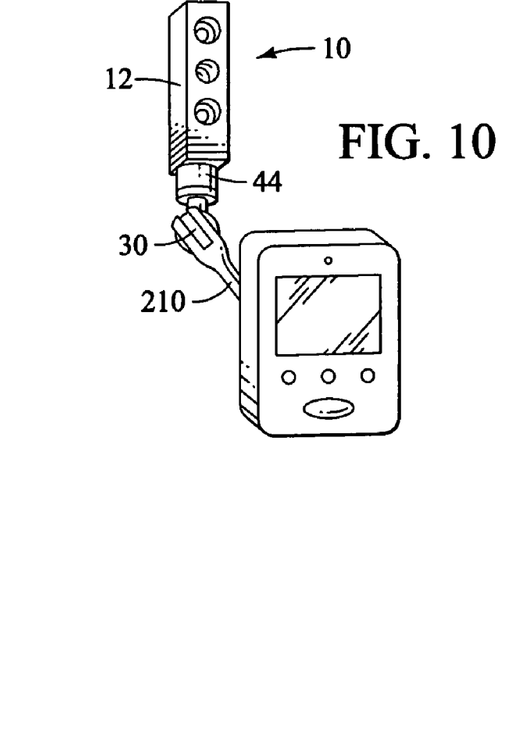
FIG. 10 is an isometric view of an accessory attached to a preferred embodiment of the present invention accessory mount, in which the accessory mount is attached in an inverted position.

In an optional fourth assembly step of the preferred embodiment, the operator may determine the orientation of body 12, positioning top side 18 of body 12 upwards as illustrated in FIGS. 1 through 9, or having top side 18 directed downwards, as illustrated in FIG. 10.

In a fifth assembly step of the preferred embodiment illustrated in FIG. 5, bolts 40 and 42 are threaded into control body 104. In the embodiment shown, standoffs 36 and 38 fit into recesses 110 and 116, and abut control bracket 106. First bolt 40 extends through body 12, through standoff 36, through control bracket 106, and is threaded into engagement with control body 104. Likewise, second bolt 42 extends through body 12, through standoff 38, through control bracket 106, and is threaded into engagement with control body 104.

In the preferred embodiment illustrated in FIG. 5, the ends of bolts 40 and 42 are located within countersinks 24 and 26 of holes 20 and 22, respectively. Depending on the configuration of control bracket 106, standoffs 36 and 38 may be located in countersinks 112 and 118. If control bracket 106 lacks countersinks, standoffs 36 and 38 may abut portals 108 and 114. In either configuration, standoffs 36 and 38 may also be positioned in recesses 110 and 116, respectively, if provided. Standoffs 36 and 38 are "bolt guides" and function as spacers.

Torque applied to bolt 40 and a bolt 42 secures accessory mount 10 to control bracket 106, and further secures control bracket 106 and control body 104 (or 105) against handlebar 102.

In an optional sixth assembly step of the preferred embodiment illustrated in FIG. 5, a ball stud 30 is threaded into first accessory hole 28. Ball studs 30 and 34 are round balls mounted on threaded studs. Ball studs 30 and 34 are interchangeable and are numerically distinguished only to identify their location on body 12. Ball studs 30 and 34 are standard commercially available products, such as the RAM 236 product, available from National Products, Inc., 1017 S. Elmgrove St.—Seattle, Wash. 98108. Commercially available ball clamps can be applied to the ball portion of ball studs 30 and 34 to permit multiple positioning of any accessory.

In an optional seventh assembly step of the preferred embodiment illustrated in FIG. 5, a ball stud 34 is threaded into second accessory hole 32. Exercising steps six and seven provides accessory mount 10 with two ball studs 30 and 34 for attaching multiple accessories.

In another preferred embodiment disclosed in FIG. 4, body 12 has a radial relief 35 located on back side 16 of body 12. In a more preferred embodiment, radial relief 35 is centered between mounting holes 20 and 22. As seen in FIG. 5, radial relief 35 provides clearance between body 12 of accessory mount 10 and control bracket 106.

In another preferred embodiment, standoffs 36 and 38 are separate and detachable from body 12, as shown in FIG. 4. This feature, in combination with radial relief 35, permits removal and use of mount 10 without standoffs 36 and 38, as shown in FIG. 6. It also permits use of body 12 with standoffs 36 and 38 of various lengths.

The embodiment of FIG. 6 is thus distinguished from the embodiment of FIG. 5. In the fifth assembly step of the preferred embodiment illustrated in FIG. 6, first bolt 40 extends through body 12, through control bracket 106, and is thread connected to control body 104 (or 105). Second bolt 42 extends through body 12, through control bracket 106, and is thread connected to control body 104 (or 105). Radial relief 35 of body 12 engages control bracket 106 directly, stabilizing accessory mount 10 against control bracket 106.

Figure 7:
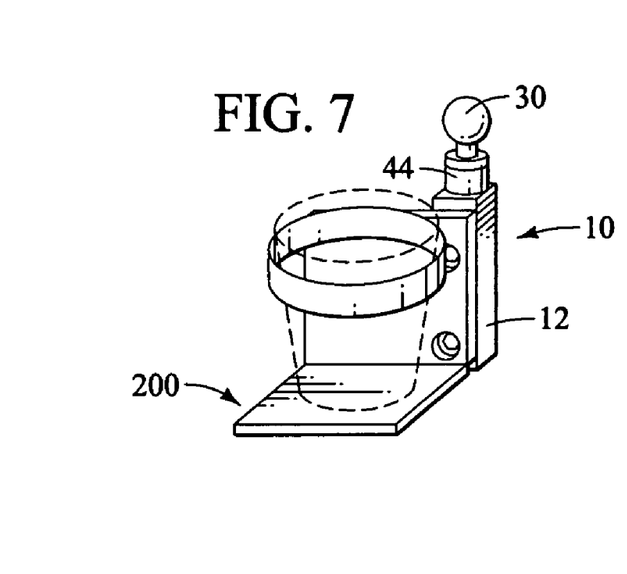
FIG. 7 is an isometric view of a cup holder type accessory attached to a preferred embodiment of the present invention accessory mount.

FIG. 7 is an isometric view of a cup holder type accessory 200 attached to accessory mount 10. In this view, it can be seen that various accessories 200 can be mounted directly to body 12 without the need for any intermediate connectivity, such as ball studs 30 and 34. Accessories 200 may be attached directly or indirectly to bolt holes 20 and 22 (not visible in this view) and/or threaded holes 28 and 32 (not visible in this view).

In an optional embodiment disclosed in FIGS. 7 through 10, a top portion 44 of body 12 is cylindrical in shape. FIG. 8 is an isometric view of a radar detector type accessory 200 attached to accessory mount 10. In this configuration, accessory mount 10 includes a ball stud 30. A ball clamp 210 secures accessory 200 in pivotal relationship to accessory mount 10.

FIG. 9 is an isometric view of accessory mount 10 attached to left side control bracket 106. A global positioning system (GPS) type accessory 200 is attached to accessory mount 10 at first ball stud 30. A music player type accessory 200 is attached to accessory mount 10 at second ball stud 34. A ball clamp 210 attaches accessory 200 in pivotal relationship to accessory mount 10. This view illustrates the capability of accessory mount 10 to support accessories 200 on either side of handlebar 102 of a vehicle 100. This view also illustrates the capability of accessory mount 10 to securely support multiple accessories 200.

FIG. 10 is an isometric view of accessory mount 10, attached to left side control bracket 106. In this embodiment, accessory mount 10 is attached in an inverted position relative to its position, with bottom side 20 directed generally upwards. This view illustrates the capability of accessory mount 10 to be mounted in an inverted position, and thus provide multiple orientations and locations for attachment of accessories 200 relative to handlebar 102.

It will be readily apparent to those skilled in the art that the general principles defined herein may be applied to other embodiments and applications without departing from the spirit and scope of the present invention. One skilled in the art will specifically recognize that alternative arrangements of the disclosed components can achieve an equivalent function and result without departing from the spirit and scope of the present invention.

I claim:

1. A vehicle accessory mount adapted for attachment to a control bracket of a handle-barred vehicle throttle or clutch control body, comprising:
    a body adapted for attachment to the control bracket;
    a pair of substantially parallel mounting holes extending through the body;
    the mounting holes aligned with portals in the control bracket;
    a radial relief located between the parallel mounting holes;
    a threaded accessory hole in the body; and,
    wherein the body is attachable to the control bracket by location of fasteners through the mounting holes and control bracket portals in threaded connection with the control body.

2. The vehicle accessory mount of claim 1, each mounting hole further comprising:
    a cylinder portion; and,
    a countersink portion that is larger in diameter than the cylinder portion.

3. The vehicle accessory mount of claim 1, further comprising:
    wherein the body is generally rectangular.

4. The vehicle accessory mount of claim 1, further comprising:
    wherein the threaded accessory hole is located between the mounting holes.

5. The vehicle accessory mount of claim 1, further comprising:
wherein the threaded accessory hole is located in substantially perpendicular relationship to the mounting holes.

6. The vehicle accessory mount of claim 1, further comprising:
a ball stud attached to the threaded accessory hole.

7. A vehicle accessory mount adapted for attachment to a control bracket of a handle-barred vehicle throttle or clutch control body, comprising:
a body adapted for attachment to the control bracket;
a pair of substantially parallel mounting holes extending through the body;
the mounting holes aligned with portals in the control bracket;
a ball stud attached to the body; and,
wherein the body is attachable to the control bracket by location of fasteners through the mounting holes and control bracket portals in threaded connection with the control body.

8. A vehicle accessory mount adapted for attachment to a control bracket of a handle-barred vehicle throttle or clutch control body, comprising:
a body adapted for attachment to the control bracket;
a pair of substantially parallel mounting holes extending through the body;
the mounting holes aligned with portals in the control bracket;
a pair of hollow standoffs locatable between the mounting holes and bolt portals in the control bracket;
a threaded accessory hole in the body; and,
wherein the body is attachable to the control bracket by location of fasteners through the mounting holes and standoffs and control bracket portals in threaded connection with the control body.

9. The vehicle accessory mount of claim 8, further comprising:
wherein the body is generally rectangular.

10. The vehicle accessory mount of claim 8, the body further comprising:
a radial relief located between the parallel mounting holes.

11. The vehicle accessory mount of claim 8, further comprising:
wherein the threaded accessory hole is located between the mounting holes.

12. The vehicle accessory mount of claim 8, further comprising:
wherein the threaded accessory hole is located in substantially perpendicular relationship to the mounting holes.

13. The vehicle accessory mount of claim 8, each mounting hole further comprising:
a cylinder portion; and,
a countersink portion that is larger in diameter than the cylinder portion.

14. The vehicle accessory mount of claim 8, further comprising:
wherein the inside diameter of each hollow standoff is substantially the same as the inside diameter of the cylinder portion of the mounting holes.

15. A vehicle accessory mount adapted for attachment to a control bracket of a handle-barred vehicle throttle or clutch control body, comprising:
a body adapted for attachment to the control bracket;
a pair of substantially parallel mounting holes extending through the body;
the mounting holes aligned with portals in the control bracket;
a pair of hollow standoffs locatable between the mounting holes and the portals;
a ball stud attached to the body; and,
wherein the body is attachable to the control bracket by location of fasteners through the mounting holes and standoffs and control bracket portals in threaded connection with the control body.

16. The vehicle accessory mount of claim 8, further comprising:
wherein the threaded accessory hole in the body is receivable of one of an accessory and a ball stud in threaded connection.

17. The vehicle accessory mount of claim 8, further comprising:
wherein each standoff is locatable in a recess on the control bracket.

18. The vehicle accessory mount of claim 8, further comprising:
wherein each standoff is locatable in a countersunk portion on the control bracket.

19. A vehicle accessory mount adapted for attachment to a control bracket of a handle-barred vehicle throttle or clutch control body, comprising:
a body adapted for attachment to the control bracket;
a threaded accessory hole in the body;
a pair of substantially parallel mounting holes extending through the body;
the mounting holes aligned with portals in the control bracket;
a pair of hollow standoffs locatable between the mounting holes and bolt portals in the control bracket; and,
wherein the body is attachable to the control bracket by location of fasteners through the mounting holes and standoffs and control bracket portals in threaded connection with the control body.

* * * * *